(12) United States Patent
Tiziani et al.

(10) Patent No.: US 9,333,813 B2
(45) Date of Patent: May 10, 2016

(54) TIRE INFLATION SYSTEM HAVING A PASSAGE FOR ROUTING PRESSURIZED GAS THROUGH A FLANGE

(71) Applicant: ArvinMeritor Technology, LLC, Troy, MI (US)

(72) Inventors: Eugenio Tiziani, Cameri (IT); Eric Lewandowski, Summerville, SC (US); Christopher Keeney, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 250 days.

(21) Appl. No.: 13/965,400

(22) Filed: Aug. 13, 2013

(65) Prior Publication Data

US 2015/0047764 A1  Feb. 19, 2015

(51) Int. Cl.
*B60C 23/04* (2006.01)
*B60C 23/00* (2006.01)

(52) U.S. Cl.
CPC ..................... *B60C 23/003* (2013.01)

(58) Field of Classification Search
CPC .................................................... B60C 23/003
USPC ................................................. 152/416, 417
See application file for complete search history.

(56) References Cited

U.S. PATENT DOCUMENTS

| | | | | |
|---|---|---|---|---|
| 4,431,043 A * | 2/1984 | Goodell et al. | ............... | 152/417 |
| 4,582,107 A * | 4/1986 | Scully | ........................... | 152/417 |
| 4,892,128 A * | 1/1990 | Bartos | ........................... | 152/417 |
| 5,080,156 A * | 1/1992 | Bartos | ........................... | 152/417 |
| 5,080,157 A * | 1/1992 | Oerter | ........................... | 152/417 |
| 5,174,839 A * | 12/1992 | Schultz et al. | ............... | 152/415 |
| 5,203,391 A * | 4/1993 | Fox | .............................. | 152/416 |
| 5,253,688 A * | 10/1993 | Tigges | .......................... | 152/417 |
| 6,145,559 A * | 11/2000 | Ingram, II | .................... | 152/417 |
| 6,199,611 B1 * | 3/2001 | Wernick | ........................ | 152/417 |
| 6,719,028 B2 * | 4/2004 | D'Amico et al. | ............. | 152/415 |
| 6,994,136 B2 | 2/2006 | Stanczak | | |
| 7,207,365 B2 * | 4/2007 | Nelson et al. | ................. | 152/417 |
| 7,690,412 B1 * | 4/2010 | Jenkinson et al. | ............ | 152/416 |
| 7,931,061 B2 * | 4/2011 | Gonska et al. | ................ | 152/417 |
| 8,052,400 B2 * | 11/2011 | Isono | ............................. | 417/233 |
| 8,616,254 B2 | 12/2013 | Kelley et al. | | |
| 8,915,274 B2 * | 12/2014 | Eschenburg et al. | ......... | 152/416 |
| 2002/0112802 A1 * | 8/2002 | D'Amico et al. | ............. | 152/415 |
| 2005/0205182 A1 * | 9/2005 | Maquaire et al. | ............. | 152/417 |
| 2008/0127773 A1 * | 6/2008 | Solie et al. | ................... | 74/606 A |
| 2009/0101261 A1 * | 4/2009 | Collet et al. | .................. | 152/417 |
| 2009/0283190 A1 * | 11/2009 | Padula et al. | ................. | 152/417 |
| 2010/0147429 A1 * | 6/2010 | Gonska et al. | ................ | 152/417 |
| 2010/0181739 A1 * | 7/2010 | Eschenburg et al. | .. | 280/124.125 |
| 2012/0186714 A1 | 7/2012 | Richardson | | |
| 2012/0234447 A1 * | 9/2012 | Narloch et al. | ............... | 152/418 |
| 2013/0228258 A1 * | 9/2013 | Knapke et al. | ................ | 152/415 |
| 2014/0261941 A1 * | 9/2014 | Knapke et al. | ................ | 152/417 |

(Continued)

OTHER PUBLICATIONS

Meritor an ArvinMeritor brand, Meritor Tire Inflation System (MTIS) by PSI(TM), including Mentor ThermALERT (TM), PB-9999, Revised May 2007.

*Primary Examiner* — Jeffrey J Restifo

(74) *Attorney, Agent, or Firm* — Brooks Kushman P.C.

(57) ABSTRACT

A tire inflation system having a first conduit and a flange. The first conduit may supply a pressurized gas for inflating a tire. The flange may be coupled to an axle flange. The flange may have a passage that routes the pressurized gas through the flange.

20 Claims, 2 Drawing Sheets

(56) References Cited

U.S. PATENT DOCUMENTS

| | | | |
|---|---|---|---|
| 2015/0047764 A1* | 2/2015 | Tiziani et al. | 152/417 |
| 2015/0059945 A1* | 3/2015 | Flory et al. | 152/417 |
| 2015/0059946 A1* | 3/2015 | Keeney et al. | 152/417 |
| 2015/0059947 A1* | 3/2015 | Power et al. | 152/419 |
| 2015/0068654 A1* | 3/2015 | Lewandowski et al. | 152/419 |
| 2015/0075688 A1* | 3/2015 | Keeney et al. | 152/417 |
| 2015/0101722 A1* | 4/2015 | Lakin et al. | 152/417 |
| 2015/0101723 A1* | 4/2015 | Keeney et al. | 152/423 |

* cited by examiner

TIRE INFLATION SYSTEM HAVING A PASSAGE FOR ROUTING PRESSURIZED GAS THROUGH A FLANGE

TECHNICAL FIELD

This patent application relates to a tire inflation system that has a passage for routing pressurized gas through a flange.

BACKGROUND

A tire inflation system with an integral wheel seal is disclosed in U.S. Pat. No. 7,931,061.

SUMMARY

In at least one embodiment, a tire inflation system is provided. The tire inflation system may include a first conduit, an axle shaft, and a flange. The first conduit may supply a pressurized gas for inflating a tire. The axle shaft may have an axle flange disposed at a distal end. The flange may be coupled to the axle flange and may have a passage that routes the pressurized gas through the flange.

In at least one embodiment, a tire inflation system is provided. The tire inflation system may include a first conduit, an axle shaft, a flange, and a seal assembly. The first conduit may supply a pressurized gas for inflating a tire. The axle shaft may be configured to rotate about an axis and may have an axle flange disposed at a distal end. The flange may be coupled to the axle flange. The flange may have a flange hole. The seal assembly may be disposed in the flange hole. The seal assembly may fluidly connect the first conduit to a second conduit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
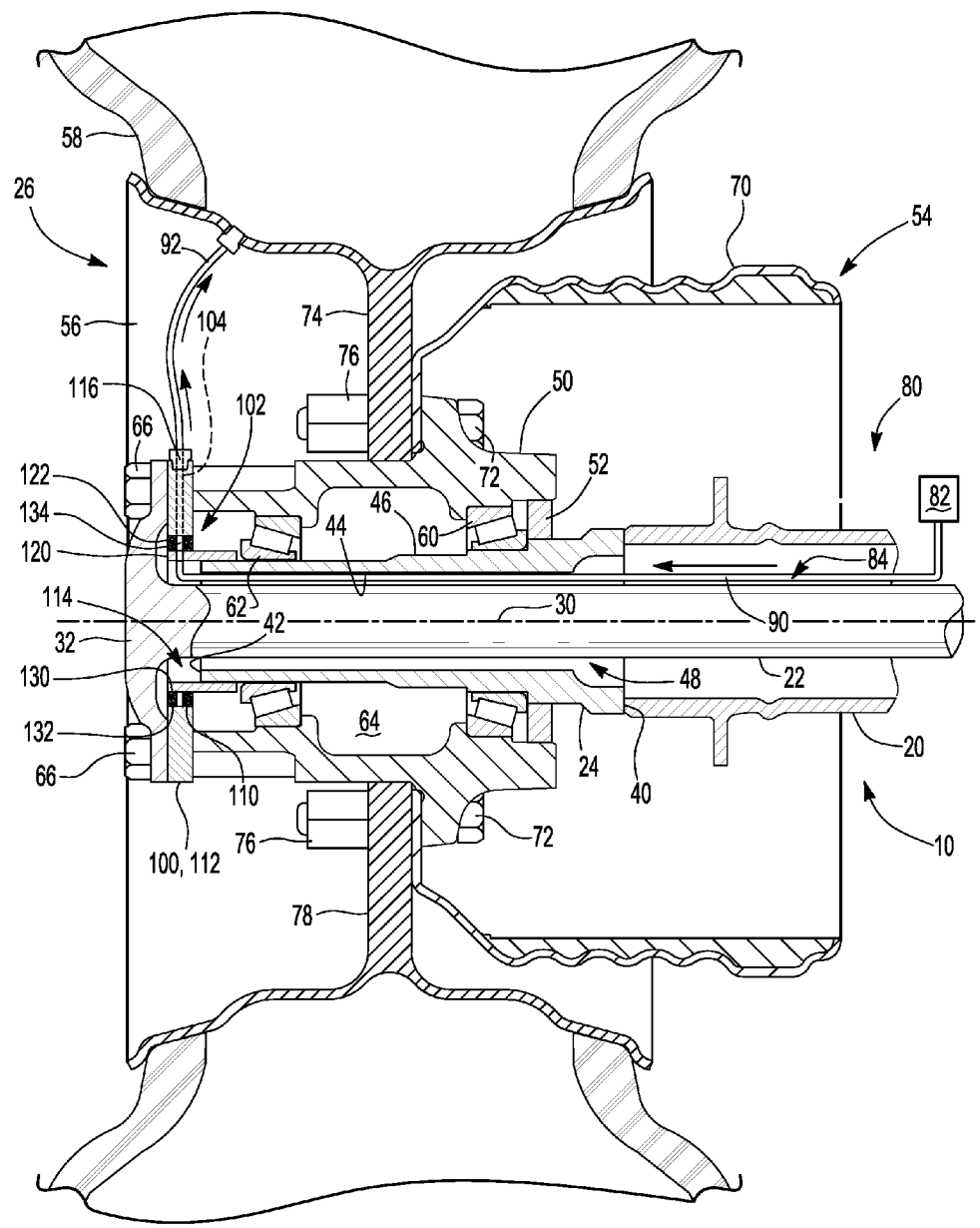
FIG. 1 is a section view of an exemplary wheel end assembly having a tire inflation system, a flange, and a seal assembly.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first end surface 40, a second end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first end surface 40 may be disposed proximate or may engage the axle housing 20. The second end surface 42 may be disposed opposite the first end surface 40 and may be located near the axle flange 32. The internal surface 44 may extend between the first end surface 40 and the second end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a wheel end seal assembly 52, a brake subsystem 54, a wheel 56, and a tire 58.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle 22 or axle flange 32.

The wheel end seal assembly 52 may be disposed between the spindle 24 and the hub 50. The wheel end seal assembly 52 may inhibit contaminants from entering the cavity 64 and may help retain lubricant in the cavity 64. In at least one embodiment, the wheel end seal assembly 52 may be fixedly disposed with respect to the hub 50 and may rotate about the axis 30 and with respect to the spindle 24.

The brake subsystem 54 may be adapted to slow or inhibit rotation of at least one associated wheel 56. For example, the brake subsystem 54 may be configured as a friction brake, such as a drum brake or a disc brake. In FIG. 1, a portion of the brake subsystem 54 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 56.

The wheel 56 may be fixedly disposed on the hub 50. For example, the wheel 56 may be mounted on the hub 50 via the fasteners 72. More specifically, the wheel 56 may have a wheel mounting flange 74 that may have a set of holes that may each receive a fastener 72. A lug nut 76 may be threaded onto each fastener to secure the wheel 56 to the fasteners 72 and the hub 50. The lug nut 76 may engage or may be disposed proximate an outboard side 78 of the wheel mounting flange 74 that faces way from the brake drum 70 or toward the axle flange 32. The wheel 56 may be configured to support the tire 58. The tire 58 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 58. For clarity, the term "pressurized gas" may refer to either a pressurized gas or a pressurized gas mixture. The tire inflation system 80 may include a control system that may monitor and control the inflation of one or more tires 58, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 58. As such, the pressurized gas source 82 may inflate a tire or maintain a desired tire pressure.

The gas supply subsystem 84 may fluidly connect the pressurized gas source 82 to the tire 58. The gas supply subsystem 84 may include one or more conduits, such as a hose, tubing, pipe, or combinations thereof. In FIG. 1, a first conduit 90 and a second conduit 92 are shown. The first conduit 90 may be fluidly connected to or may receive pressurized gas from the pressurized gas source 82. The second conduit 92 may supply pressurized gas to the tire 58. In addition, one or more valves may be associated with or provided with a conduit to enable or disable the flow of the pressurized gas from the pressurized gas source 82 to one or more tires 58. Likewise, one or more check valves may be provided with the gas supply subsystem 84 to inhibit the flow of pressurized gas toward the pressurized gas source 82. The flow of pressurized gas is represented by the arrows in the conduits in FIGS. 1-3.

Figure 2:
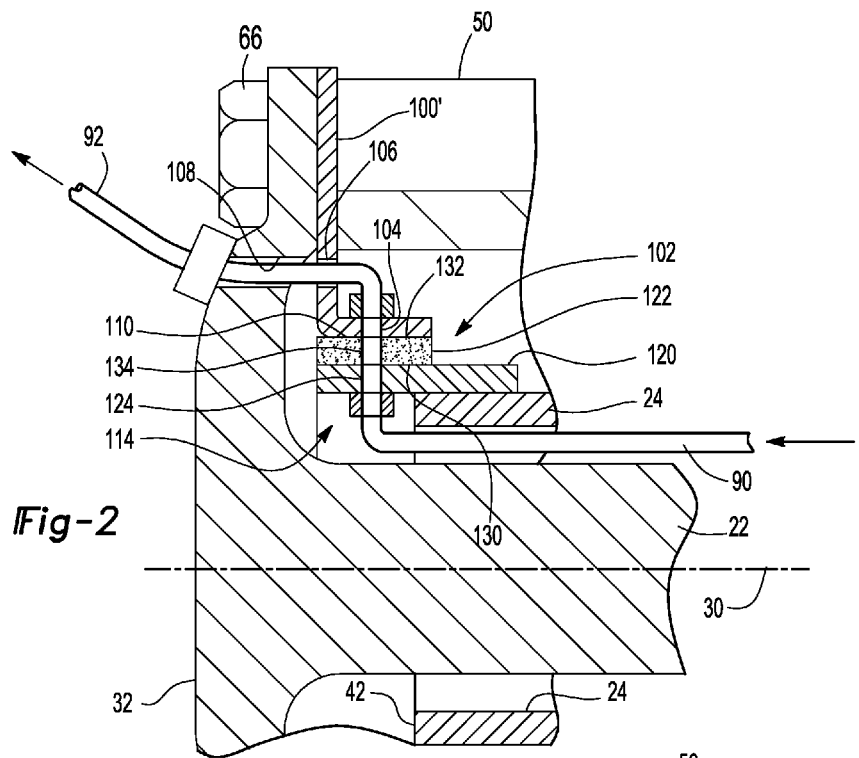
FIG. 2 is a section view of another flange and seal assembly that may be provided with the wheel end assembly.
Figure 3:
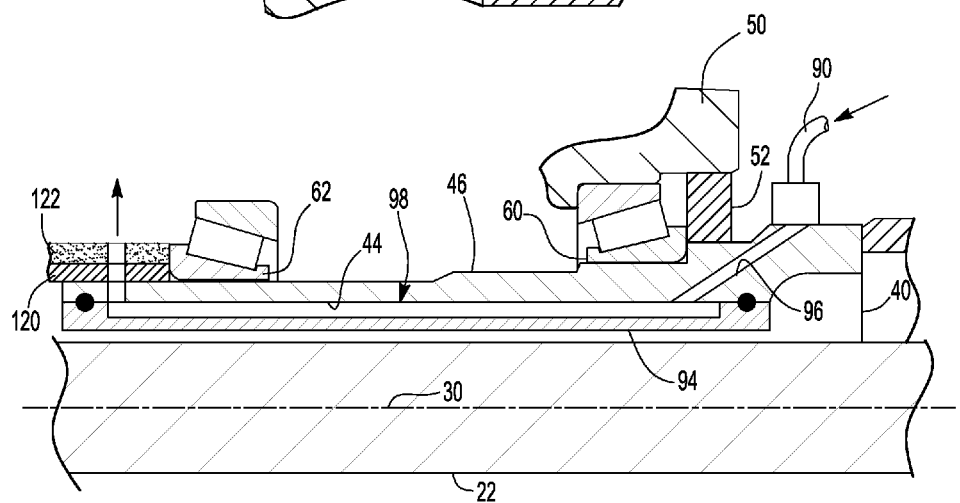
FIG. 3 is an example of a conduit that may be disposed between a spindle and a sleeve.

Referring to FIGS. 1 and 2, exemplary interfaces between the wheel end assembly 26 and the gas supply subsystem 84 are shown. In FIGS. 1 and 2, the first conduit 90 is disposed between the axle shaft 22 and the spindle 24. More specifically, the first conduit 90 may extend through the hole 48 in the spindle 24 and may be spaced apart from the axle shaft 22. Alternatively, the first conduit 90 may be at least partially defined by the spindle 24 and a sleeve 94 as is best shown in FIG. 3. For example, the first conduit 90 may include a first portion 96 and a second portion 98. The first portion 96 may be located near the first end surface 40 of the spindle 24 and may extend from the external surface 46 to the internal surface 44. The second portion 98 may be at least partially defined by the spindle 24 and the sleeve 94. More specifically, the sleeve 94 may be disposed adjacent to the internal surface 44 of the spindle 24 and the second portion 98 may be defined as a groove that may extend axially from the first portion 96 toward the second end surface 42 of the spindle 24. The groove may be provided in the spindle 24 and/or the sleeve 94. In addition, one or more seals, such as o-rings, may be disposed between the spindle 24 and the sleeve 94 to inhibit leakage of pressurized gas.

Referring again FIGS. 1 and 2, the interfaces between the wheel end assembly 26 and the first conduit 90 may include a flange 100 and a seal assembly 102.

The flange 100 may be configured to rotate with the axle shaft 22 and the wheel 56. For example, the flange 100 may be disposed between and may engage the axle flange 32 and the hub 50 and may be spaced apart from the spindle 24. The flange 100 may be secured to the axle flange 32 and/or the hub 50 with one or more fasteners 66. In at least one embodiment, the flange 100 may extend continuously around the axis 30 in a ring-like manner.

The flange 100 may be provided in various configurations. In FIG. 1, the flange 100 is configured as a disk that has a passage 104 that routes the pressurized gas through the flange 100. The passage 104 may extend through the flange 100. In addition, the passage 104 or a portion thereof may extend radially or substantially perpendicular to the axis 30. In one or more embodiments, the passage 104 may extend from a first flange surface 110 to a second flange surface 112.

The first flange surface 110 may be an interior surface of the flange 100 that may face toward the axis 30. The first flange surface 110 may at least partially define a flange hole 114. The flange hole 114 may be radially disposed about the axis 30 and may be a through hole that may extend through the flange 100. The flange hole 114 may receive an end of the first conduit 90 and the seal assembly 102. The first flange surface 110 may have a passage inlet that may be fluidly connected to the first conduit 90. The passage inlet may be part of the passage 104 and may include a passage inlet groove that may extend continuously around the axis 30 in a ring-like manner. As such, the passage inlet groove may receive pressurized gas from the first conduit 90 as the axle shaft 22 rotates about the axis 30 and with respect to at least a portion of the seal assembly 102.

The second flange surface 112 may be an exterior surface of the flange 100 and may be spaced apart from the first flange surface 110. For example, the second flange surface 112 may be disposed opposite the first flange surface 110. The second flange surface 112 may have a passage outlet 116 that may be may be fluidly connected to the tire 58 via the second conduit 92. The passage outlet 116 may be part of the passage 104 and may be fluidly connected to the tire 58 by the second conduit 92.

In FIG. 2, the flange 100' includes a passage 104 that also extends through the flange 100'; however, this passage 104 may have a shorter length than the flange 100 in FIG. 1. The flange 100' may include a secondary passage or hole 106 that may face toward the axle flange 32. The axle flange 32 may have axle flange hole 108 that may be a through hole that may extend through the axle flange 32. The hole 106 and the axle flange hole 108 may receive the second conduit 92, thereby routing the second conduit 92 around the perimeter of the axle flange 32 to the tire 58.

The seal assembly 102 may fluidly connect the first conduit 90 to the second conduit 92. The seal assembly 102 may be disposed between the axle shaft 22 and the flange 100 or outside the axle shaft 22. More specifically, the seal assembly 102 may be disposed at least partially in the flange hole 114 and may be disposed proximate or may engage the first flange surface 110. In at least one embodiment, the seal assembly 102 may include a support bracket 120 and a seal 122.

The support bracket 120 may position and hold the seal 122. In at least one embodiment, the support bracket 120 may be fixedly disposed on the spindle 24. As such, the support bracket 120 may not rotate about the axis 30. The support bracket 120 may hold the seal 122 against the first flange surface 110. As such, the support bracket 120 may hold the seal 122 against the flange 100 such that leakage of pressurized gas between the seal 122 and the flange 100 is inhibited. A single support bracket 120 may extend continuously around the axis 30 in a ring-like manner or a plurality of support brackets 120 may be provided that may be spaced apart from each other and arranged around the axis 30 to hold the seal 122 against the flange 100. The support bracket 120 may be secured to the spindle 24 in any suitable manner, such as with a fastener, interference fit or press fit, or by welding. The support bracket 120 may be disposed proximate the first conduit 90 and may include a conduit hole 124 that may receive or fluidly connect the first conduit 90 to the seal 122.

The seal 122 may help fluidly connect the first conduit 90 to the second conduit 92. The seal 122 may be disposed between and may engage the flange 100 and the support bracket 120. In at least one embodiment, the seal 122 may be configured as a ring that may extend continuously around the spindle 24 and the axis 30. Alternatively the seal 122 may be configured as a ring that may extend continuously around the axis 30 inside the spindle 24. In at least one embodiment, the seal 122 may have an inner seal surface 130, an outer seal surface 132, and a seal passage 134.

The inner seal surface 130 may face toward the axis 30 and may at least partially define an inside circumference of the seal 122. The inner seal surface 130 may engage the support bracket 120 to help position the seal 122 and inhibit movement of the seal 122 toward or away from the axis 30.

The outer seal surface 132 may be disposed proximate or may engage the flange 100. The outer seal surface 132 may be spaced apart from the inner seal surface 130 and may at least partially define an outside circumference of the seal 122.

The seal passage 134 may be configured as a through hole that may extend from the inner seal surface 130 to the outer seal surface 132. The seal passage 134 may fluidly connect the first conduit 90 to the second conduit 92. The seal passage 134 may extend continuously around the axis 30 in a ring-like manner or may include a groove that may continuously around the axis 30 in a ring-like manner. As such, the seal passage 134 may distribute pressurized gas around the axis 30 and permit pressurized gas to flow into the passage 104 in the flange 100 as the flange 100 rotates with respect to the seal 122. Alternatively, a plurality of seal passages 134 may be provided in one or more embodiments.

Optionally, one or more check valves may be provided with the flange 100 and/or seal assembly 102 to inhibit the flow of pressurized gas toward the pressurized gas source 82.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
   a first conduit for supplying a pressurized gas for inflating a tire;
   an axle shaft having an axle flange disposed at a distal end;
   a spindle that receives the axle shaft and that has an external surface that faces away from the axle shaft;
   a flange that is coupled to the axle flange, wherein the flange has a passage that routes the pressurized gas through the flange; and
   a seal assembly that has a support bracket that extends around the external surface of the spindle, wherein the seal assembly fluidly connects the first conduit to the passage.

2. The tire inflation system of claim 1 wherein the axle shaft extends through the spindle and the flange is spaced apart from the spindle.

3. The tire inflation system of claim 1 wherein the first conduit is disposed between the axle shaft and the spindle.

4. The tire inflation system of claim 1 further comprising a hub that is rotatably disposed on the spindle, wherein the flange is disposed between the hub and the axle flange.

5. The tire inflation system of claim 4 wherein the passage is fluidly connected to the tire that is disposed on a wheel that is mounted to the hub.

6. The tire inflation system of claim 1 wherein the axle shaft rotates about an axis and wherein the passage extends substantially perpendicular to the axis.

7. The tire inflation system of claim 1 wherein the flange has a flange hole, wherein the first conduit is at least partially disposed in the flange hole.

8. The tire inflation system of claim 7 wherein the seal assembly is disposed between the first conduit and the flange and the seal assembly has a seal passage that fluidly connects the first conduit to the passage in the flange.

9. The tire inflation system of claim 8 wherein the seal assembly is disposed in the flange hole.

10. The tire inflation system of claim 8 wherein the seal assembly includes a seal disposed on the support bracket, wherein the support bracket is fixedly positioned with respect to the spindle.

11. The tire inflation system of claim 10 wherein the seal rotates with respect to the support bracket.

12. A tire inflation system comprising:
    a first conduit for supplying a pressurized gas for inflating a tire;
    an axle shaft that is configured to rotate about an axis and that has an axle flange disposed at a distal end;
    a spindle that receives the axle shaft and that has an external surface that faces away from the axle shaft;
    a flange that is coupled to the axle flange, wherein the flange has a flange hole; and
    a seal assembly that is disposed in the flange hole, wherein the seal assembly fluidly connects the first conduit to a second conduit and has a support bracket that is disposed on and extends around the external surface of the spindle.

13. The tire inflation system of claim 12 wherein the seal assembly further comprises a seal that is supported by the support bracket.

14. The tire inflation system of claim 13 wherein the support bracket is fixedly positioned with respect to the spindle.

15. The tire inflation system of claim 13 wherein the seal and the flange rotate with respect to the support bracket.

16. The tire inflation system of claim 13 wherein the flange has a hole and wherein the second conduit extends through the hole.

17. The tire inflation system of claim 16 wherein the axle flange has an axle flange hole and wherein the second conduit extends through the axle flange hole.

18. The tire inflation system of claim 12 wherein the second conduit rotates about the axis with respect to the first conduit.

19. The tire inflation system of claim 12 wherein the axle shaft extends through a hole in the spindle and the first conduit is disposed between the axle shaft and the spindle.

20. The tire inflation system of claim 19 wherein the first conduit is at least partially defined by the spindle and a sleeve that is disposed in the hole in the spindle and that engages the spindle.

* * * * *